(12) United States Patent  
Artsyukhovich et al.

(10) Patent No.: US 8,004,764 B2  
(45) Date of Patent: Aug. 23, 2011

(54) COLOR COMPENSATING RETINAL SAFETY FILTER

(75) Inventors: Alex N. Artsyukhovich, Dana Point, CA (US); T. Scott Rowe, Dana Point, CA (US)

(73) Assignee: Novartis AG, Basel (CH)

( * ) Notice: Subject to any disclaimer, the term of this patent is extended or adjusted under 35 U.S.C. 154(b) by 653 days.

(21) Appl. No.: 11/577,513

(22) PCT Filed: Oct. 26, 2005

(86) PCT No.: PCT/US2005/039199
§ 371 (c)(1),
(2), (4) Date: Jul. 19, 2007

(87) PCT Pub. No.: WO2006/047768
PCT Pub. Date: May 4, 2006

(65) Prior Publication Data
US 2008/0218863 A1    Sep. 11, 2008

(51) Int. Cl.
*G02B 1/10* (2006.01)
(52) U.S. Cl. .................................................. 359/589
(58) Field of Classification Search ........... 359/577–590
See application file for complete search history.

(56) References Cited

U.S. PATENT DOCUMENTS

| | | | |
|---|---|---|---|
| 5,101,411 A * | 3/1992 | Terao et al. ........................ 372/21 |
| 5,335,648 A | 8/1994 | Kozawa et al. | |
| 5,966,240 A | 10/1999 | Lange et al. | |
| 6,179,421 B1 | 1/2001 | Pang | |
| 6,331,914 B1 | 12/2001 | Wood, II et al. | |
| 6,391,400 B1 | 5/2002 | Russell et al. | |
| 6,468,204 B2 * | 10/2002 | Sendai et al. ................ 600/160 |
| 6,485,300 B1 * | 11/2002 | Muller et al. .................... 433/29 |
| 6,773,104 B2 * | 8/2004 | Cornelius et al. ............ 347/106 |
| 6,844,976 B1 * | 1/2005 | Firon et al. .................... 359/586 |
| 7,198,755 B2 * | 4/2007 | Tokhtuev et al. .......... 422/82.02 |
| 7,450,306 B2 * | 11/2008 | Chen ............................ 359/588 |
| 2003/0216626 A1 * | 11/2003 | Tsujita et al. ................ 600/321 |
| 2004/0148141 A1 * | 7/2004 | Tsujita et al. ................ 702/190 |

FOREIGN PATENT DOCUMENTS

| | | |
|---|---|---|
| DE | 4017419 A1 | 10/1991 |
| EP | 0409554 A2 | 1/1991 |
| GB | 2302412 A | 1/1997 |
| WO | WO 0138246 A2 | 5/2001 |

OTHER PUBLICATIONS

Hot Mirror HM-07 Transmission Data, Optical-Filters.com, Mar. 16, 2003.

* cited by examiner

*Primary Examiner* — Michael P Stafira
(74) *Attorney, Agent, or Firm* — Darien Reddick (57) ABSTRACT

A filter and method for filtering an optical beam are disclosed. One embodiment of the filter is an optical filter for filtering an incident light beam, comprising an optically effective material characterized by: a light transmittance of less than 1% for wavelengths below 420 nm; and a light transmittance for wavelengths complementary and near complementary to wavelengths below 420 nm that, combined with the transmittance for wavelengths below 420 nm, will yield a filtered light beam having a luminosity of about 90% and an excitation purity of 5% or less. The complementary wavelengths can be wavelengths above about 640 nm, wavelengths above about 660 nm, and/or wavelengths from about 540 nm to about 560 nm.

15 Claims, 8 Drawing Sheets

COLOR COMPENSATING RETINAL SAFETY FILTER

CROSS REFERENCE TO RELATED APPLICATION

This application claims priority under 35 U.S.C. §119 to International Application No. PCT/US2005/039199 filed Oct. 26, 2005, the entire contents of which are incorporated herein by reference.

TECHNICAL FIELD OF THE INVENTION

The present invention relates generally to the field of optical safety filters for blocking electromagnetic radiation having wavelengths hazardous to the human eye. In particular, the present invention relates to optical safety filters that block hazardous wavelength radiation while transmitting other visible wavelengths. Even more particularly, the present invention is directed to a color-compensating retinal safety filter for blocking hazardous wavelength radiation directed at a retina while transmitting near-white color-compensated light to a surgical site.

BACKGROUND OF THE INVENTION

A number of ophthalmic surgical procedures performed on a patient's retina require illuminating the retina with a light spot. Some exemplary procedures include a vitrectomy, macula hole surgery, retinal detachment surgery, and diabetic retinopathy surgery. In one ophthalmic surgical procedure, typically referred to as retinal photocoagulation, a laser light spot is directed to a selected portion of a patient's retina to deposit energy, thereby causing coagulation of the local tissue. Such a photocoagulation procedure can be employed, for example, to seal leaky blood vessels, destroy abnormal blood vessels, or seal retinal tears. For such procedures, the surgeon performing the procedure must be able to not only properly observe the site and its surroundings during the procedure, but must be able to do so safely, without fear of harm to his or her own retina from the reflected illumination light spot.

For these and other ophthalmic procedures a surgeon will typically employ a light source, such as a high brightness xenon illumination source, to illuminate a surgical site and allow him or her to clearly see the area of surgical interest. Such light sources, however, project light comprising multiple wavelengths, including violet and ultra-violet wavelengths that have been found to be harmful to human retinas. In such cases, it is not only the patient's eyes that must be protected from the harmful wavelength radiation, but also the observing surgeon's eyes.

To minimize the risk to a surgeon's eyes, optical safety filters are extensively used in many types of direct-vision optical systems to protect the eyes of a user from damage by reflected light radiation, such as laser and other illumination light radiation, and also to protect the patient from harmful direct illuminating light radiation. One type of system in which such filters are used is a laser surgery system, such as for performing the procedures described above, which can deliver laser and illumination light source radiation to a surgical site on a patient for tissue ablation, artery incision, etc., while permitting a surgeon performing the procedure to observe the surgical site.

ISO Standard 15752 describes hazards to the retina associated with absorption of certain ultra-violet ("UV") and near-UV wavelengths, specifically those wavelengths below 420 nm. It is an accepted safety precaution to filter ophthalmic illumination sources to prevent the transmission of these UV and near-UV wavelength radiation to lower the risk of harm to the retinas of an observing surgeon and/or a patient. However, filtering UV radiation from an illumination source results in filtered light having a tint that is not color-neutral, but is instead, for example, a bright yellow color. Bright yellow (or other colored) illumination of a surgical site can disrupt a surgeon's color perception. For a surgeon using a filtered illumination light, UV filtration resulting in a pronounced transmission color will make it difficult for the surgeon to properly assess the conditions at the surgical site. As a result, surgeon comfort, efficiency, and, ultimately, the quality of the surgical result, can be compromised.

Therefore, a need exists for a color-compensating retinal safety filter for use in a surgical illuminator that can reduce or eliminate the coloration and other problems associated with prior art optical safety filters.

BRIEF SUMMARY OF THE INVENTION

The embodiments of the color-compensating retinal safety filter of the present invention substantially meet these needs and others. One embodiment of the present invention is an optical filter for filtering an incident light beam, comprising an optically effective material characterized by: a light transmittance of less than 1% for wavelengths below 420 nm; and a light transmittance for wavelengths complementary (or near-complementary) to wavelengths below 420 nm that, combined with the transmittance for wavelengths below 420 nm, will yield a filtered light beam having a luminosity of about 90% and an excitation purity of 5% or less. The complementary wavelengths can be wavelengths above about 640 nm, wavelengths above about 660 nm, and/or wavelengths from about 540 nm to about 560 nm. Further, in one embodiment the difference between the light transmittance just below 420 nm and the light transmittance just above 420 nm can be greater than 90%. Above 420 nm, in some embodiments, the light transmittance can be arbitrarily determined.

The optically effective material can be optical-grade glass, an optical-grade plastic or polymer, a thin-film dielectric coating, or an optical-grade glass or plastic coated with a dielectric coating. In some embodiments, the optically effective material can comprise an intra-ocular lens. The optical filter can be mounted downstream of an illumination source exit aperture, wherein the illumination source produces the incident light beam, and upstream of a site to be illuminated by the filtered light beam. Alternatively, the optical filter can be operably mounted on a set of viewing optics of a surgical microscope. In this case, the incident light beam to be filtered will comprise a reflected portion of a light beam produced by an illumination source and used to illuminate a site, such as a surgical site.

Other embodiments of the present invention can include a method for color-compensated filtering of an optical beam. One embodiment of the method in accordance with the teachings of this invention can comprise the steps of: providing an illumination light source operable to produce the optical beam and direct the optical beam along an optical path; positioning an optical filter in the optical path such that the optical beam is incident on the optical filter, the optical filter being operable to receive the incident optical beam and produce an output light beam, wherein the optical filter comprises an optically effective material characterized by: a light transmittance of less than 1% for wavelengths below 420 nm; and a light transmittance for wavelengths complementary to wavelengths below 420 nm that, combined with the transmittance for wavelengths below 420 nm, will result in the output light beam having a luminosity of about 90% and an excitation purity of 5% or less; and directing the output light beam onto a site to illuminate the site Embodiments of this invention can be implemented as a filter for reflected light from a surgical site or as a filter mounted downstream of an illumination source exit aperture, but upstream of the site to be illuminated, to remove harmful wavelength radiation from the illumination light before it is transmitted to a desired site. Further, embodiments of this invention can be incorporated into a surgical machine or system for use in ophthalmic or other surgery. Embodiments of the present invention can also be implemented in an intraocular lens to filter and provide protection against certain wavelength radiation, such as ultra-violet light. Intraocular lenses could thus be color-compensating to filter ultra-violet radiation, while transmitting near color-neutral light to the wearer so that he or she can observe a more natural color scheme. Other uses for a color-compensating retinal safety filter designed in accordance with the teachings of this invention will be apparent to those familiar with the art.

BRIEF DESCRIPTION OF THE SEVERAL VIEWS OF THE DRAWINGS

A more complete understanding of the present invention and the advantages thereof may be acquired by referring to the following description, taken in conjunction with the accompanying drawings, in which like reference numbers indicate like features and wherein:

FIG. 7 is a graph of all the transmission properties of another embodiment of this invention; and.

DETAILED DESCRIPTION OF THE INVENTION

Preferred embodiments of the present invention are illustrated in the FIGUREs, like numerals being used to refer to like and corresponding parts of the various drawings.

The various embodiments of the present invention provide for color compensation of a retinal safety filter to achieve a more natural lighting scheme at a surgical site. Typically, filtering of radiation in the near ultra-violet end of the electromagnetic spectrum (or other wavelengths) results in the light passing through such a blocking filter having a pronounced color (non-white) tint. In accordance with the teachings of the present invention, removing (filtering) light of wavelengths complementary to the near-UV wavelengths can balance the color characteristics of the filtered light such that the filtered (transmitted) light is perceived as white or near white. Thus, a person observing an object or a surgical site illuminated through such a color-compensating UV retinal safety filter will be protected from harmful UV radiation, while also having a near color-neutral lighting scheme that provides for more "natural" color perception. A color-compensating retinal safety filter in accordance with the present invention can be preferably mounted directly on an illuminating source exit aperture to remove harmful UV radiation. Alternatively, such a filter can be mounted in the viewing optics of a surgical microscope to filter reflected light from the surgical site.

Although ISO Standard 15752 dictates the wavelengths near the UV edge of the electromagnetic spectrum that must be filtered to lower the risk of retinal damage, the embodiments of the present invention take advantage of the options available at the red edge of the electromagnetic spectrum to color-compensate light filtered in accordance with the 15752 Standard. For example, shifting the allowable transmitted wavelengths at the red edge of the spectrum to less than about 640 nm (i.e., filtering out those wavelengths above about 640 nm) can compensate for removing the violet/near-UV wavelengths and some of the blue wavelengths at the other edge of the illumination spectrum. The resulting light exiting a color-compensating retinal safety filter of this invention can thus be made to appear white or near white. In this way, a surgeon's color perception can be maintained close to that of a natural illumination scheme, while also maintaining the safety of a patient's and the surgeon's retinas.

The embodiments of the color-compensating retinal safety filter of the present invention can provide color compensation for a wide range of blue and violet light removed from the white light spectrum of illumination. A color-compensating retinal safety filter is preferably mounted in front of an illumination source so that only color-compensated light will reach the surgical field. Retinal safety can thus be maintained without distorting a surgeon's color perception and thus improving the likelihood of a successful surgical outcome. The embodiments of the present invention take advantage of the complementary principles of visible light to compensate for filtered wavelengths (in this case violet/near-UV) by also filtering wavelengths complementary to the violet wavelengths to achieve a near color-neutral output from a filter. Removing the complementary wavelengths shifts the color coordinates of the filtered illumination back towards white light.

It is desirable for "hot" and "cold" mirrors (filters) used in ophthalmic instruments to have color properties that result in a transmitted light that is as near color-neutral as possible. By providing for near color-neutral (near white or gray) transmitted light, such filters can provide illumination of a surgical site that maintains an observer's color perception close to what it would be under natural lighting (sunlight) conditions (or under "typical" artificial lights). What this generally means is that it is desirable for the filter to have a high luminosity (visible light transmission), thus producing a brighter output from the filter. A retinal safety filter should also have a low excitation purity, or color tint, so that the output illumination from the filter will be white or near white, as opposed to yellow, pink or some other color. The lower the excitation purity, the closer the output from the filter is to gray or color-neutral.

Hot and cold mirrors are both designed for infrared ("IR") radiation (heat) management. A hot mirror is designed to reflect infrared radiation and to transmit visible (cold, non-heating) radiation. A cold mirror, on the other hand, reflects visible radiation and transmits infrared radiation. Some ophthalmic instrument optical designs combine hot and cold filters to achieve better IR filtering. For example, first a cold mirror in the optical path will transmit IR radiation in the received light (approximately 80% of infrared radiation) and direct it to be absorbed in a heat sink/trap. The cold mirror will also reflect visible light, and some leftover infrared radiation, onto a hot mirror. The hot mirror will then reflect (filter) the leftover IR radiation (approximately 90% of the leftover IR radiation) and transmit the visible light as its output. In this way, IR radiation is filtered twice. The first stage (cold mirror) directs only about 20% of the IR along the desired optical path, and then the hot mirror reflects greater than about 90% of the remaining 20%. As a result, only about 2% of the incoming IR radiation is output along the optical path of an instrument, such as a high brightness illuminator, used for ophthalmic surgery. Further, ISO Safety Standard 15752 recommends filtering of light that will impinge upon a retina so that the light transmission rate is minimal (e.g., below 1% for wavelengths shorter than 420 nm and below 50% for wavelengths shorter than 450 nm (the "short wavelength blocking requirement")).

Figure 1:
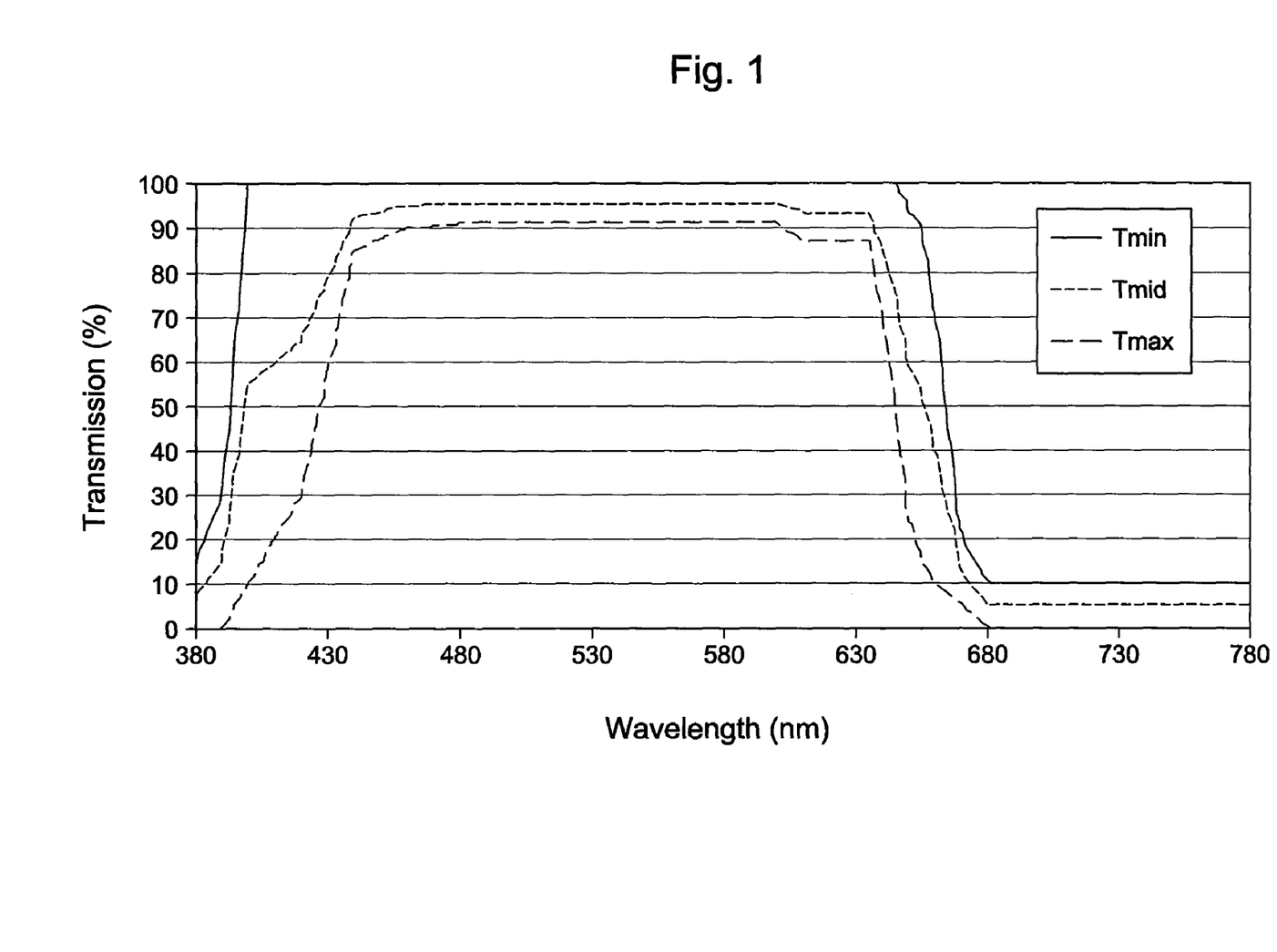
FIG. 1 is a graph representing the design specifications for a hot mirror design with acceptable color properties.

The embodiments of the color-compensating retinal safety filter of the present invention reconcile the competing requirements of a high luminosity/low excitation purity, infrared blocking capability and short wavelength blocking capability required to achieve both retinal safety and a color-neutral lighting environment at a surgical site. FIG. 1 shows the design specifications for a hot mirror design with acceptable color properties. Transmission percentage is shown as a function of wavelength and it can be seen from FIG. 1 that this hot mirror design does not meet the filtering specifications of the short wavelength blocking requirement. However, the filter design of FIG. 1 does provide relatively low excitation purity (on average about 2.2%) and a high average luminosity of 93.8%.

The light transmitted by the filter represented in FIG. 1 is near color-neutral and would provide for a desirable color environment at a surgical site. However, to meet the short wavelength blocking requirement it is necessary to design properties into a filter that result in a non-white lighting scheme at an illuminated site. For example, the filter design of FIG. 1, when modified to meet the short wavelength blocking requirement, results in a filter having, for example, a luminosity of 97.4%, a dominant wavelength of 570 nm, and an excitation purity of 42.9%. This is assuming uniform white illumination and the CIE-E ("International Commission on Illumination") reference white value. Thus, the luminosity for the modified filter is very high, which is good, but the high excitation purity means that the light transmitted by the filter is far from "whitish" in appearance. The actual color of the transmitted light is indicated by the dominant wavelength, which in this case is yellow. This yellow illumination at a surgical site distorts the surgical field for a surgeon, resulting in, at the very least, added discomfort and increased difficulty for the surgeon during a surgical procedure, and, at worst, surgical errors and a bad outcome for the patient.

Figure 2:
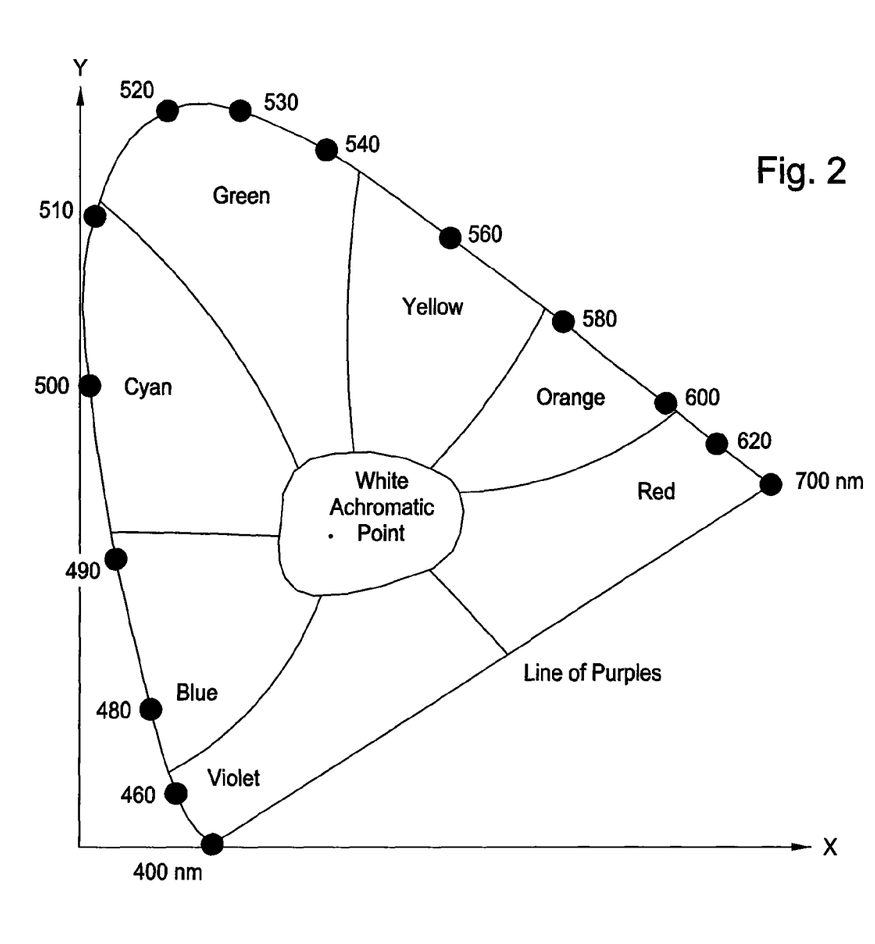
FIG. 2 is an example CIE color chart.

The International Commission on Illumination ("CIE") color chart was derived from a series of tests conducted to determine how human observers perceive color, the result being a Standard Observer Light and Color Perception Chart. Humans have three types of color receptors, with the sensitivity of each type centered on the three colors of blue, green and red. Each color that a human can see can be described by a response to these three types of receptors. These responses are called color matching functions and are designated by the symbols X, Y, and Z. The CIE chart represents the measured spectral dependencies of these human responses.

to FIG. 2 is an example CIE color chart. Because the sum of the X, the Y, and the Z color matching functions only contains information about the total intensity of the corresponding light, not its color, one can describe color with only two "chromaticity coordinates". For example, $x=X/(X+Y+Z)$ and $y=Y/(X+Y+Z)$. If one takes the three CIE color matching functions, charts their measured values on the CIE chart and plots in an x,y coordinate system, one can determine the area that outlines the entire range of colors that a Standard Observer can see.

As shown in FIG. 2, the perimeter of the CIE chart is outlined by the so called "pure colors"—colors that a human perceives from receiving monochromatic (single wavelength) light at his or her color receptors. The bottom line of the CIE chart that closes the "horseshoe" plot, however, does not represent a pure color and is labeled the "Line of Purples". The purple colors of this line are created by combining two wavelengths. On the CIE chart, white light has chromaticity coordinates of x=0.33 and y=0.33, as can be seen from FIG. 2. The closer the chromaticity coordinates of light, such as the output from a retinal safety filter, are to (0.33, 0.33), the whiter the light will appear. The color tint of transmitted light can be determined on the CIE chart by connecting the point representing white light (0.33, 0.33) with the color coordinates of the transmitted light (for example, (0.32, 0.35)), and extending the line connecting the two points to the monochromatic horseshoe perimeter. The point where the line crosses the perimeter indicates the wavelength of the dominant color (tint) of transmission. The ratio of distances from the white point (0.33, 0.33) to the color point (for example, (0.32, 0.35)) along this line to the total length of the line that starts at the white point and ends at the point of "pure" dominant color is called "excitation purity", and provides a measure of light coloration. Excitation purity equals 0 for white light and equals 1 for "pure" color. If the same line is extended back to the opposite side of the (0.33, 0.33) white light chromaticity coordinates, the tint of the reflected "supplemental" or "complementary" color is provided by the point at which the line crosses the chart perimeter.

Figure 3:
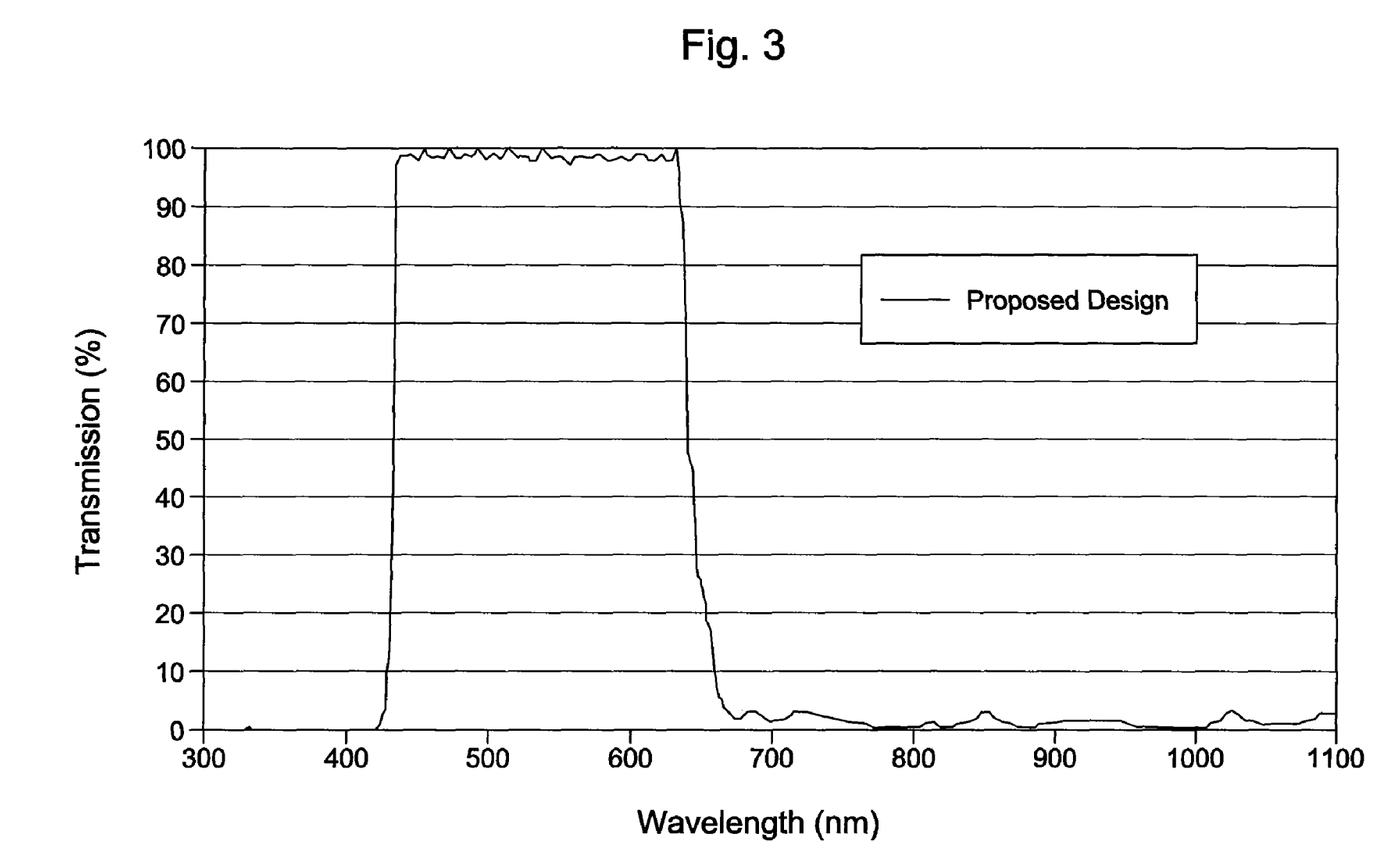
FIG. 3 is a graph of the transmission properties of one embodiment of a color-compensating retinal safety filter of this invention.

Although the UV blocking requirements of ISO Standard 15752 have resulted in prior art filters transmitting light with undesirable color properties, by relaxing the short wavelength blocking requirement, together with color-compensating in accordance with this invention, a filter having good color correction, high luminosity and sufficient near-UV blockage for enhanced retinal safety can be achieved. FIG. 3 shows the transmission properties of one embodiment of a color-compensating retinal safety filter of the present invention in which the requirement for transmission to be below 1% for wavelengths shorter than 420 nm is retained, while relaxing the need to keep transmission below 50% for wavelengths shorter than 450 nm. The characteristics of this filter take advantage of a very steep filter cut-off edge at the short wavelength side of the spectrum to make transmission as high as possible just to the long wavelength side of the <1% 420 nm requirement (e.g., a transmission difference of 90% or greater from just below the 420 nm wavelength to just above 420 nm).

The color properties of the embodiment of the color-compensating retinal safety filter of the present invention shown in FIG. 3 are as follows: luminosity=95.8%; dominant wavelength=556 nm; and excitation purity=9.3%. This embodiment of the filter of the present invention has a relatively low excitation purity and transmits a slightly green light. However, slightly green illumination at a surgical site, while an improvement over the prior art, is not the white or near-white (color neutral) illumination scheme desired at a surgical site. Meeting the short wavelength blocking requirement requires a compromise in luminosity and/or excitation purity. By relaxing the short wavelength blocking requirement to allow transmission to be arbitrarily high above 420 nm, yet still be below 1% below 420 nm, an excitation purity below 10% can be achieved along with a high luminosity (approximately 95%). The embodiment of FIG. 3 is a viable embodiment, but not a preferred embodiment of the present invention.

Figure 4:
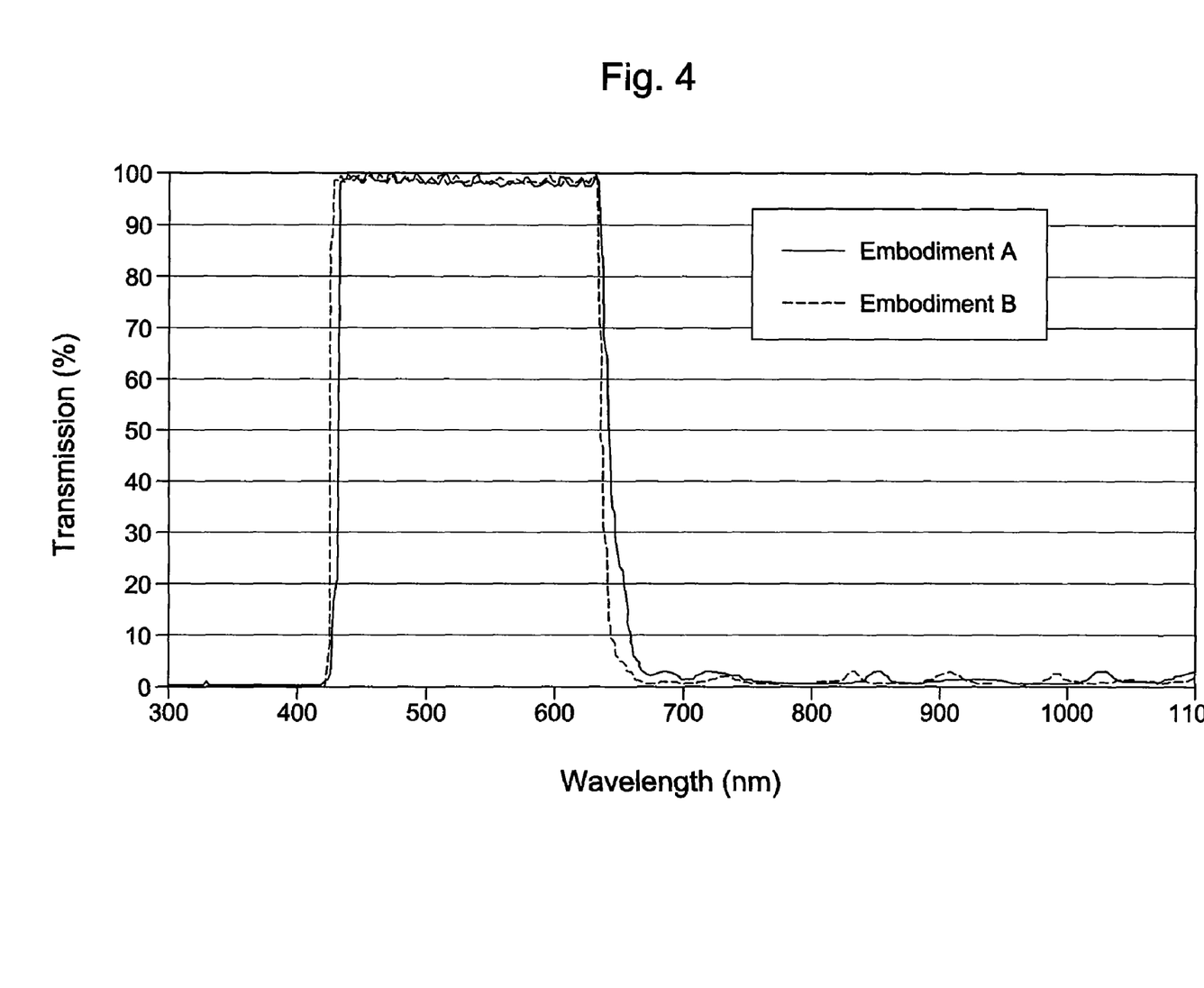
FIG. 4 is a graph of the transmission specifications of the embodiments of this invention.

FIG. 4 shows the transmission properties of another embodiment of this invention, labeled as Embodiment B, that takes advantage of the ability to manufacture filters with steep edges for blocking light of undesirable wavelengths. FIG. 4 compares the transmission specification of Embodiment B to that of the embodiment of FIG. 3. Embodiment B has a steep transmission edge at the short wavelength side of the spectrum that is substantially steeper than the corresponding edge of the embodiment of FIG. 3 (Embodiment A). The long wavelength edge is also somewhat steeper. The resulting color properties of the two embodiments are summarized below in Table 1.

TABLE 1

|  | Luminosity (%) | Dominant Wavelength (nm) | Excitation Purity (%) |
| --- | --- | --- | --- |
| Embodiment A | 95.9 | 556 | 9.3 |
| Embodiment B | 95.2 | 524 | 3.8 |

Figure 5:
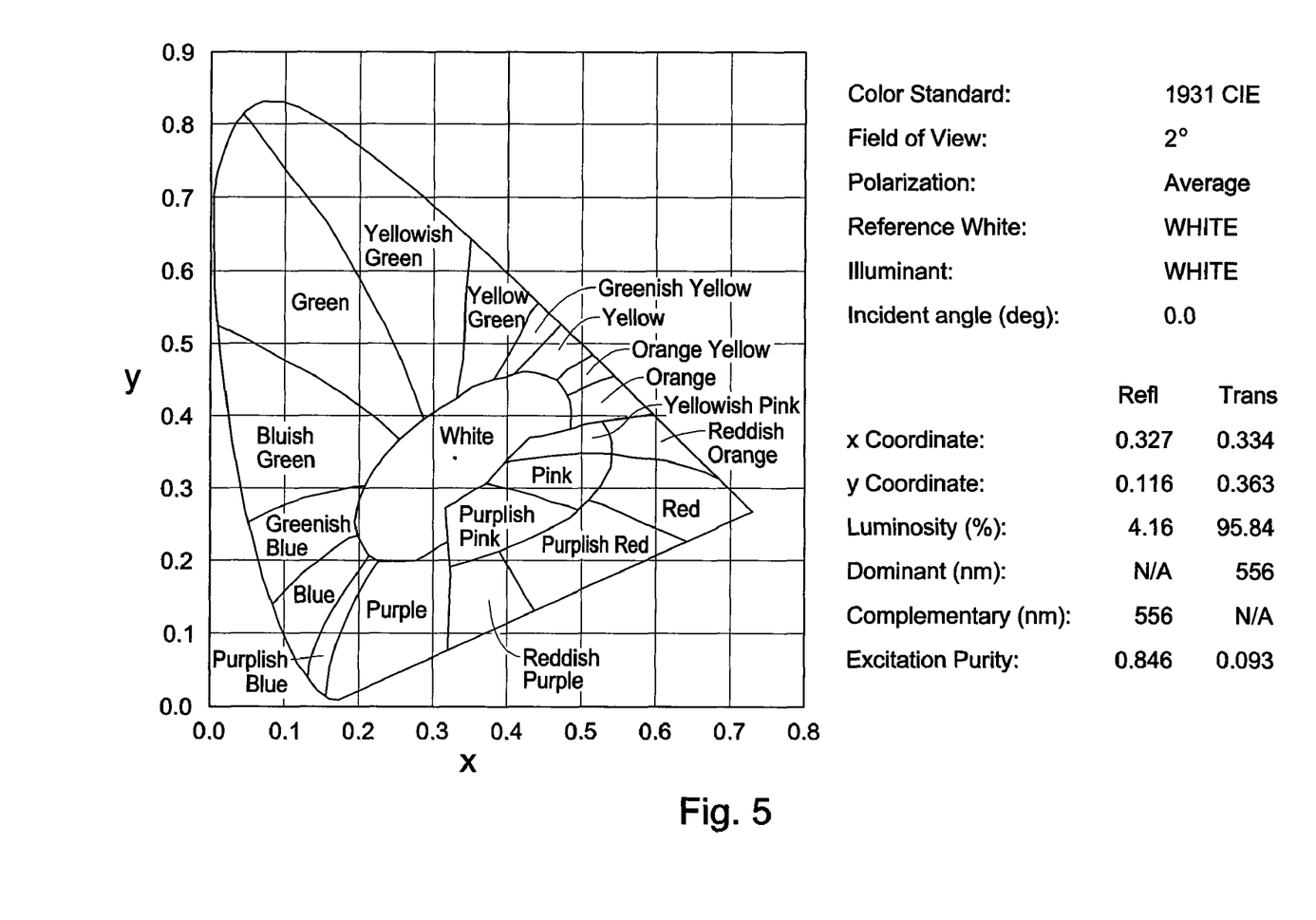
FIGS. 5 & 6 are charts of the color properties of the embodiments of the present invention represented in FIG. 4.
Figure 6:
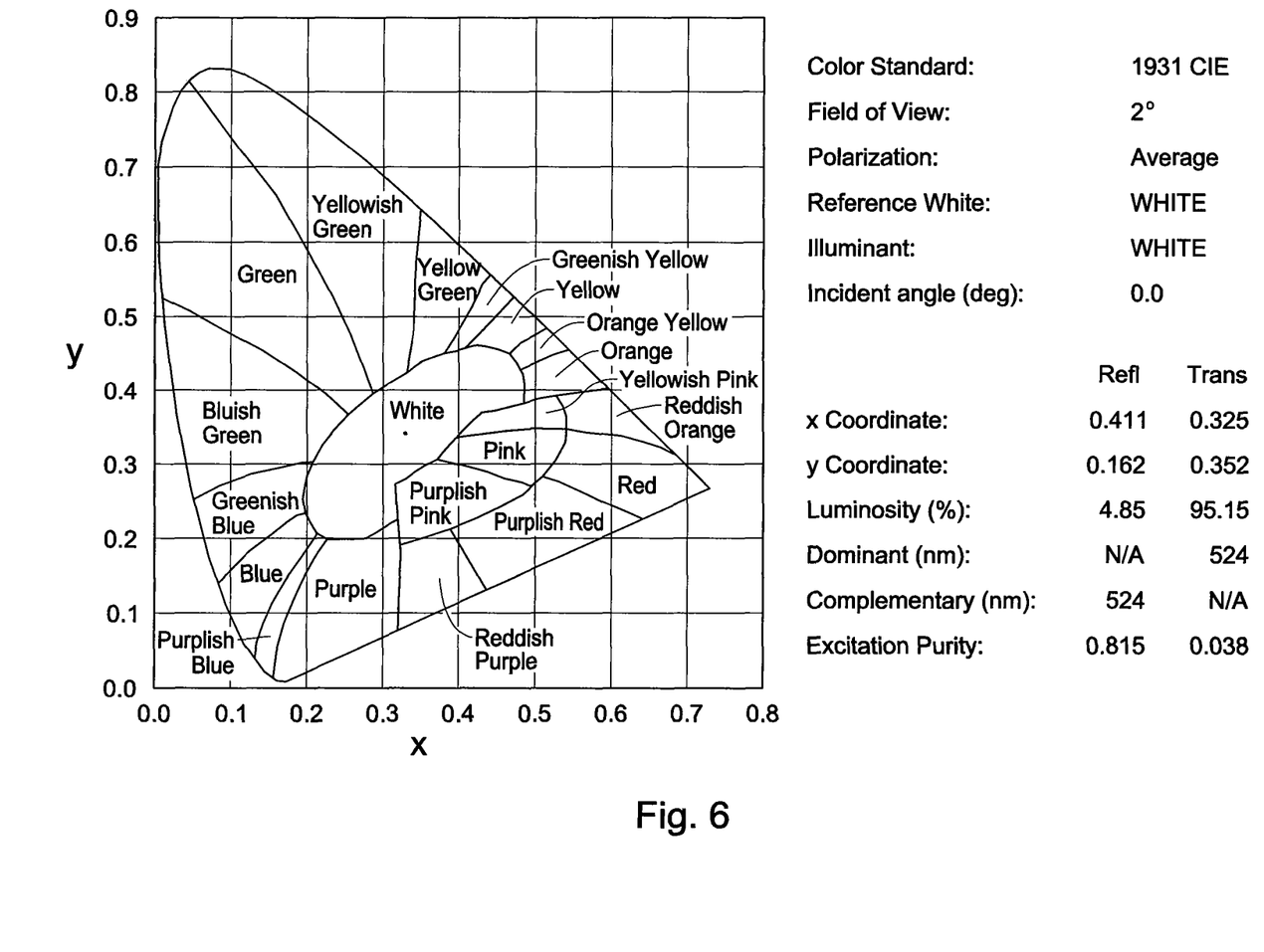

As can be seen from Table 1, Embodiment B has a luminosity of 95.2%, a dominant wavelength of 524 nm and an excitation purity of 3.8%, which is substantially lower than the excitation purity of Embodiment A. Embodiment B thus maintains a very high luminosity (above 95%), while achieving a very low excitation purity, resulting in an illumination scheme at a surgical site that is much closer to color neutral. FIGS. 5 and 6 illustrate the color properties of Embodiments A and B, respectively, including reflection and transmission properties with reference to the CIE color chart.

The embodiments of the present invention described thus far are not designed to compensate for the effects of any additional filters that could be used in an ophthalmic instrument in which they may be implemented. However, a typical cold mirror, for example, that might be used in concert with the embodiments of this invention, likely will have a negligible impact on the color performance of a hot mirror (filter) of this invention. Furthermore, it should be noted that the short wavelength edge design of the embodiments of this invention has the greatest impact on the color performance of the filters, but even for spectral shifts of up to 4 nm to the red or blue at the short wavelength edge of the transmission curve, a filter made in accordance with the specifications of Embodiment B of the present invention can maintain an excitation purity below 5%. The designs presented above also have a built-in 4 nm red-shift in the short wavelength edge so that variations in this edge position due to manufacturing or alignment tolerances will not violate the 1% at 420 nm short wavelength blocking requirement.

Figure 7:
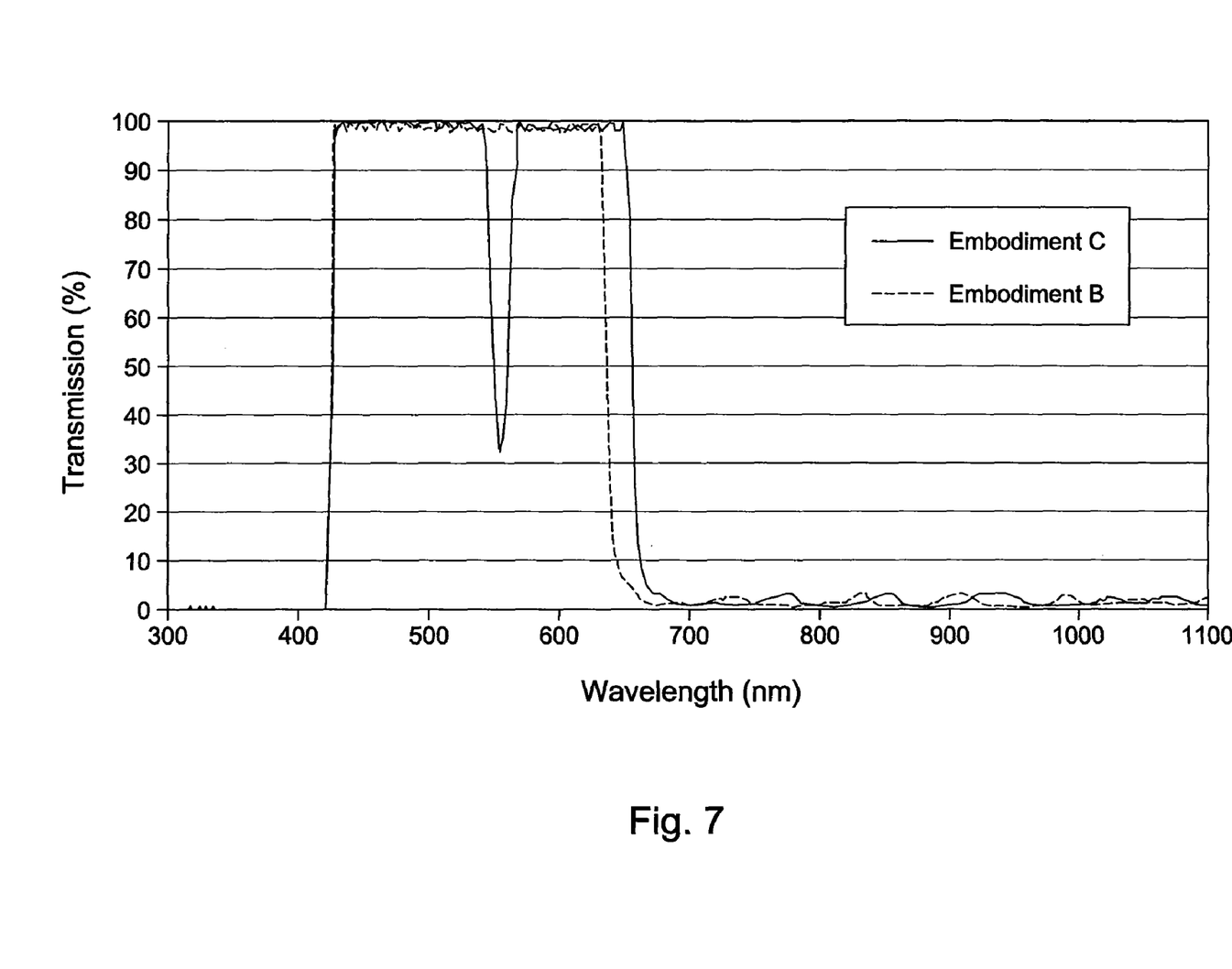

The transmission specification of another embodiment of the color-compensating retinal safety filter of the present invention is shown in FIG. 7 ("Embodiment C"), compared against that of Embodiment B. Embodiment C provides a substantial improvement in excitation purity from the previously described embodiments without significantly compromising luminosity. A main difference between Embodiment C of FIG. 7 and Embodiment B of FIG. 4 is that the long wavelength edge of Embodiment C has been shifted to the right (red) by about 20 nm and a small notch has been opened in the green portion of its transmission spectrum. Table 2 below summarizes the color properties of Embodiment C compared to Embodiment B of FIG. 4.

TABLE 2

|  | Luminosity (%) | Dominant Wavelength (nm) | Excitation Purity (%) |
| --- | --- | --- | --- |
| Embodiment C | 88.2 | 648 | .3 |
| Embodiment B | 95.2 | 524 | 3.8 |

As can be seen from Table 2, Embodiment C has a luminosity of 88.2%, a dominant wavelength of 648 nm and an excitation purity of only 0.3%. Embodiment C thus maintains a luminosity of about 90%, while achieving an extremely low excitation purity below 1%. The design of Embodiment C also does not incorporate the effects of an additional cold mirror, nor the effects of other optical elements, such as an optical fiber, that may be part of a light delivery system in an ophthalmic surgical system implementing an embodiment of the color-compensating retinal safety filter of this invention. However, these additional optical components likely will have a very small impact on the transmitted light color properties. Further, slight alterations in the design of a color-compensating retinal safety filter of this invention can be made to account for even the small effects of an optical fiber or an additional cold mirror, as will be apparent to those familiar with the art. It should further be noted that the short wavelength edge of the embodiments of this invention have the greatest impact on color performance, but even for spectral shifts of up to 3 nm to the red or blue at the short wavelength edge of the transmission curve, a filter made in accordance with the specification of Embodiment C can maintain an excitation purity below 1.5%.

The embodiments of the color-compensating retinal safety filter of the present invention are designed to lower the aphakic hazard per ISO Standard 15752 (i.e., less than 1% transmission for wavelengths below 420 nm). By relaxing the short wavelength blocking requirement with regards to transmission below 50% of wavelengths shorter than 450 nm, providing a sharp cut-off at 420 nm, and shifting the long-wavelength edge of the filter transmission spectrum to provide color compensation, filters designed in accordance with the present invention can transmit enough blue, green, yellow, orange and even red visible light to provide for a more color-neutral illumination at a surgical site. As a result, a surgeon can illuminate his or her surgical site without the color contrast compromises of the prior art.

The embodiments of the present invention can be manufactured in accordance with well known filter manufacturing techniques, as will be apparent to those familiar with the art. By specifying the spectrum and physical properties, such as the density of defects and the stability to environment, the various coatings and the order of the coatings, as well as the material for the filter, will be apparent to those familiar with the art and can be selected by a manufacturer to best suit the needs of the manufacturer while delivering the requested transmission spectrum and color properties. The appropriate color compensating scheme, as per the teachings of the present invention, can thus be accomplished by various manufacturing means.

Any thin film dielectric coating design that meets the spectral properties described herein is acceptable, and thus the teachings of this invention allow for various coating technologies to be used in the design and manufacture of the disclosed filters. Two main types of technology are typically used for spectral coatings: Multi-layered "soft" coatings sandwiched between two glass plates, and "hard" multi-layered coatings vacuum deposited on one or both sides of an optical plate (substrate). The optical substrate can be an optical-grade glass, plastic or polymer as known to those having skill in the art. The layers are normally made of two or more optical materials with different refractive indexes. Chemical composition of the layers can be different with different manufacturers, and is normally proprietary. The coatings typically consist of oxides, fluorides, and carbides of different elements. Regardless of the chemical composition of the coatings, the color-compensating retinal safety filter blocking effect taught by this invention can be achieved by defining the spectrum and color compensating effects thereof.

Figure 8:
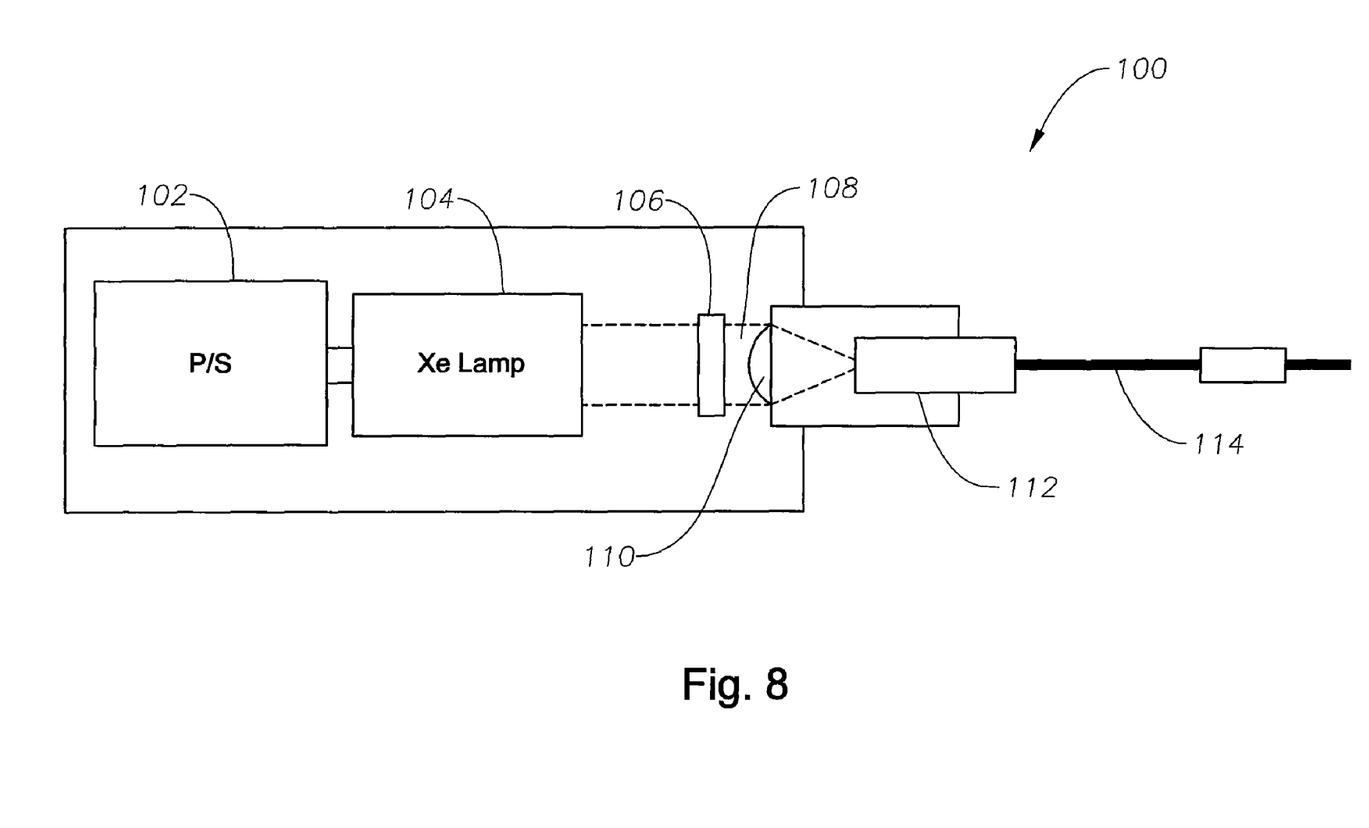
FIG. 8 is a simplified block diagram illustrating one implementation of a color-compensating retinal safety filter of the present invention.

FIG. 8 is a simplified block diagram illustrating one implementation of a color-compensating retinal safety filter of the present invention. FIG. 8 shows an illuminator 100 comprising a power supply 102 and an illumination source 104. In the example of FIG. 8, illuminator 100 is a xenon illuminator and the illumination source 104 is a xenon lamp. However, other types of lamps, as will be known to those familiar with the art, can be used for illumination source 104. Color-compensating retinal safety filter 106, designed in accordance with the present invention, is displaced along a transmission path of the illumination source 104. Some light from illumination source 104 passes though color-compensating retinal safety filter 106 (e.g., after filtering, light meeting the requirements of ISO Standard 15752) and this filtered light 108 is directed onto a lens 110, which focuses filtered light 108 onto the terminus of a fiber connector 112. The filtered light 108 is then guided along optical fiber 114, which can be used to direct the filtered light 108 onto a surgical site to illuminate the surgical site. Fiber 114 can be operably coupled to, for example, a handpiece or other handheld illumination device. Typically, the light received by filter 106 will be in the form of a collimated light beam, which it then filters and passes on to focusing lens 110, which in turn focuses the now filtered light 108 into optical fiber 114.

The various embodiments of the present invention can be implemented in any ophthalmic illuminator to achieve near-UV blocking (or other wavelength filtering) of the light originating from an illuminating light source, while maintaining the color characteristics of the filtered illuminating light at near color-neutral, thus overcoming the color and contrast distorting characteristics of prior art retinal safety filters. Further, the color compensating properties taught herein can also be implanted in intraocular lenses to provide near-UV (or other wavelength) filtering and protection to those receiving IOL implants. Currently, such devices, for example, ACRYSOF™ Natural IOLs, are tinted yellow to filter ultraviolet, violet and blue light. The teachings of the present invention, for example, could be used to color-compensate IOLs to change the yellow tint to a more color-neutral gray tint, thus filtering out damaging radiation while providing a more natural color-perception to IOL wearing persons.

The present invention has been described by reference to certain preferred embodiments; however, it should be understood that it may be embodied in other specific forms or variations thereof without departing from its spirit or essential characteristics. In particular, the color-compensating techniques of the present invention are equally applicable, and can be used to color-compensate filters or other optics, for the removal of other wavelengths of light different from those discussed in detail herein. The embodiments described above are therefore considered to be illustrative in all respects and not restrictive, the scope of the invention being indicated by the appended claims.

What is claimed is:

1. A method for color-compensated filtering of an optical beam, comprising the steps of:

providing an illumination light source operable to produce the optical beam and direct the optical beam along an optical path;

positioning an optical filter in the optical path such that the optical beam is incident on the optical filter, the optical filter being operable to receive the incident optical beam and produce an output light beam, wherein the optical filter comprises an optically effective material characterized by:

a light transmittance of less than 1% for wavelengths below 420 nm; and a light transmittance for wavelengths complementary and near complementary to wavelengths below 420 nm that, combined with the transmittance for wavelengths below 420 nm, will result in the output light beam having a luminosity of about 90% and an excitation purity of 5% or less; and directing the output light beam onto a site to illuminate the site.

2. The method of claim 1, wherein the complementary wavelengths are wavelengths above about 640 nm.

3. The method of claim 1, wherein the complementary wavelengths are wavelengths above about 660 nm.

4. The method of claim 1, wherein the complementary wavelengths comprise wavelengths above about 660 nm and wavelengths from about 540 nm to about 560 nm.

5. The method of claim 1, wherein the difference between the light transmittance just below 420 nm and the light transmittance just above 420 nm is greater than 90%.

6. The method of claim 1, wherein the optical filter is further characterized by an arbitrarily determined light transmittance for wavelengths above 420 nm.

7. The method of claim 1, wherein the optically effective material is optical-grade glass.

8. The method of claim 1, wherein the optically effective material is a thin-film dielectric coating.

9. The method of claim 1, wherein the optically effective material comprises an optical-grade glass coated with a dielectric coating.

10. The method of claim 1, wherein the optically effective material is an optical-grade plastic or polymer.

11. The method of claim 1, wherein the optical filter is characterized by a luminosity of 88.2% and an excitation purity of 0.3%.

12. The method of claim 1, wherein the optical filter is characterized by a luminosity of 95.2% and an excitation purity of 3.8%.

13. A method for color-compensated filtering of an optical beam, comprising the steps of:

providing an illumination light source operable to produce the optical beam and direct the optical beam along an optical path;

directing the optical beam onto a site to illuminate the site, wherein a reflected portion of the optical beam is reflected from the site and to a set of viewing optics;

positioning an optical filter in the set of viewing optics such that the reflected portion of the optical beam is incident on the optical filter, the optical filter being operable to receive the reflected portion of the optical beam and produce an output light beam, wherein the optical filter comprises an optically effective material characterized by:

a light transmittance of less than 1% for wavelengths below 420 nm; and a light transmittance for wavelengths complementary and near complementary to wavelengths below 420 nm that, combined with the transmittance for wavelengths below 420 nm, will result in the output light beam having a luminosity of about 90% and an excitation purity of 5% or less; and directing the output light beam to an observer at the set of viewing optics.

14. A color-compensating ophthalmic illuminator, comprising:

a power supply;

an illumination light source operable to produce an optical beam and direct the optical beam along an optical path;

an optical filter, positioned in the optical path such that the optical beam is incident on the optical filter, the optical filter being operable to receive the incident optical beam and produce an output light beam, wherein the optical filter comprises an optically effective material characterized by:

a light transmittance of less than 1% for wavelengths below 420 nm; and a light transmittance for wavelengths complementary and near complementary to wavelengths below 420 nm that, combined with the transmittance for wavelengths below 420 nm, will result in the output light beam having a luminosity of about 90% and an excitation purity of 5% or less; and a set of optics for directing the output light beam to a site to illuminate the site.

15. The color-compensating ophthalmic illuminator of claim 14, wherein the set of optics comprises a handpiece comprising an optical fiber.

* * * * *